US011824862B1

(12) United States Patent
Singh

(10) Patent No.: US 11,824,862 B1
(45) Date of Patent: Nov. 21, 2023

(54) ELECTRONIC RESOURCE ACCESS

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 52 days.

(21) Appl. No.: 17/346,437

(22) Filed: Jun. 14, 2021

(51) Int. Cl.
*H04L 9/40* (2022.01)

(52) U.S. Cl.
CPC .................. *H04L 63/101* (2013.01)

(58) Field of Classification Search
CPC ...................................... H04L 63/101
See application file for complete search history.

(56) References Cited

U.S. PATENT DOCUMENTS

| 5,995,105 A * | 11/1999 | Reber ................. H04W 12/068 709/217 |
| 10,970,378 B2 * | 4/2021 | Bendersky ............ H04L 9/3263 |
| 11,201,855 B1 * | 12/2021 | Kondamuri ......... H04L 63/0263 |
| 11,301,561 B2 * | 4/2022 | Powell .................. G06F 21/566 |
| 11,429,243 B2 * | 8/2022 | Fleck ...................... G06F 9/451 |
| 2008/0301802 A1 * | 12/2008 | Bates ...................... G06F 21/31 726/16 |
| 2013/0174267 A1 * | 7/2013 | Kass .................. H04L 63/1441 726/26 |

* cited by examiner

*Primary Examiner* — Yonas A Bayou

(57) ABSTRACT

In one aspect, an illustrative methodology implementing the disclosed techniques includes, by a computing device, receiving input via an application of the computing device, the input to initiate navigation to an electronic resource, and determining that navigation to the electronic resource via the application is insecure. The method also includes, by the computing device, responsive to the determination that the navigation is insecure, modifying the navigation to the electronic resource so as to prevent navigation to the electronic resource via the application.

18 Claims, 9 Drawing Sheets

ELECTRONIC RESOURCE ACCESS

BACKGROUND

Companies, enterprises, governments, agencies and other types of organizations may implement digital workspace solutions to allow users to access electronic resources, such as websites, web applications, software-as-a-service (SaaS) applications, virtual desktops, etc. Users may access electronic resources using personal devices and/or devices provided by an organization. An organization may implement security controls to manage access to various electronic resources. For example, company may prevent its employees from accessing certain websites using a company-owned device or a device connected to an internal company network. As another example, a company may protect certain electronic resources behind a firewall so that users can only access then when connected to an internal company network.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, although security controls exist for managing access (or navigation) to electronic resources, such controls may not be satisfactory or adequate to cover the full range of digital workspace solutions implemented and provided by a particular organization. For example, in order to enforce desired access policies, an organization may provide managed applications, such as the organization's browser application (also referred to herein as a "web browser" or more simply a "browser"), for use by its users to access electronic resources, such as the organization's software-as-a-service (SaaS) applications and web applications. However, when users navigate to or otherwise or access electronic resources using native or local browsers or using applications that open an accessed resource in a native or local browser, the organization is "out of the loop" with respect to the navigation to the electronic resource and unable to apply its access policies.

In some cases, users may be inconvenienced by access policies implemented by an organization. For example, an access policy may prevent access of certain insecure electronic resources (e.g., gmail.com) using an application other than a managed application (i.e., an application that is managed by the organization) even when the application is being used within the organization's network. This may be because accessing the insecure electronic resource may cause execution of malicious software, for example. In this case, if the user uses an application that is not a managed application and attempts to navigate to an insecure electronic resource, an applied access policy can prevent this navigation and generate an error notification to the user. Even though the attempted navigation is using an application that is running on the organization's network, the navigation is blocked by the applicable security policy, and the user is inconvenienced in having to then use a managed application to navigate to the insecure electronic resource.

While extensions (e.g., browser extensions) and plug-ins may provide controls for managing navigation to, or access of, electronic resources, users using their personal computing devices may not want these extensions and plug-ins installed on their personal devices. Moreover, the organization may not have the ability or capability to develop extensions and plug-ins to support all the different types of browsers. As still another example, while proxies, such as a local proxy that resides on the user's computing device or a network proxy that resides on the network, may provide controls for monitoring and managing navigation to, or access of, electronic resources, users may not want local proxies to be installed on their personal computing devices. With respect to network proxies, users may not want their personal network traffic to go through network proxies and be monitored. Moreover, the organization may not favor the use of such proxies for various reasons, including privacy and security concerns with respect to users using their personal computing devices, for example. In any such cases, an organization is unable to monitor and manage navigation to, or access of, electronic resources by users associated with the organization since the organization is out of the loop with respect to being able to apply its access policies to the access of electronic resources. Embodiments of the present disclosure provide solutions to these and other technical problems described herein.

In accordance with one example embodiment provided to illustrate the broader concepts, systems, and techniques described herein, a method may include, by a computing device, receiving input via an application of the computing device, the input to initiate navigation to a resource, and determining that navigation to the resource via the application is insecure. The method may also include, by the computing device, responsive to the determination that the navigation is insecure, modifying the navigation to the resource so as to prevent navigation to the resource via the application.

According to another illustrative embodiment provided to illustrate the broader concepts described herein, a system includes a memory and one or more processors in communication with the memory. The processor may be configured to receive input via an application of the computing device, the input to initiate navigation to a resource, and determine that navigation to the resource via the application is insecure. The processor may be further configured to, responsive to the determination that the navigation is insecure, modify the navigation to the resource so as to prevent navigation to the resource via the application.

According to another illustrative embodiment provided to illustrate the broader concepts described herein, a method may include, by a computing device, receiving an input via an application of the computing device to navigate to a resource and determining that the navigation is insecure based on a list of one or more addresses of allowable resources assigned to the computing device. The method may also include, by the computing device, responsive to the determination that the navigation is insecure, modifying the navigation to the resource so as to prevent navigation to the resource via the application.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
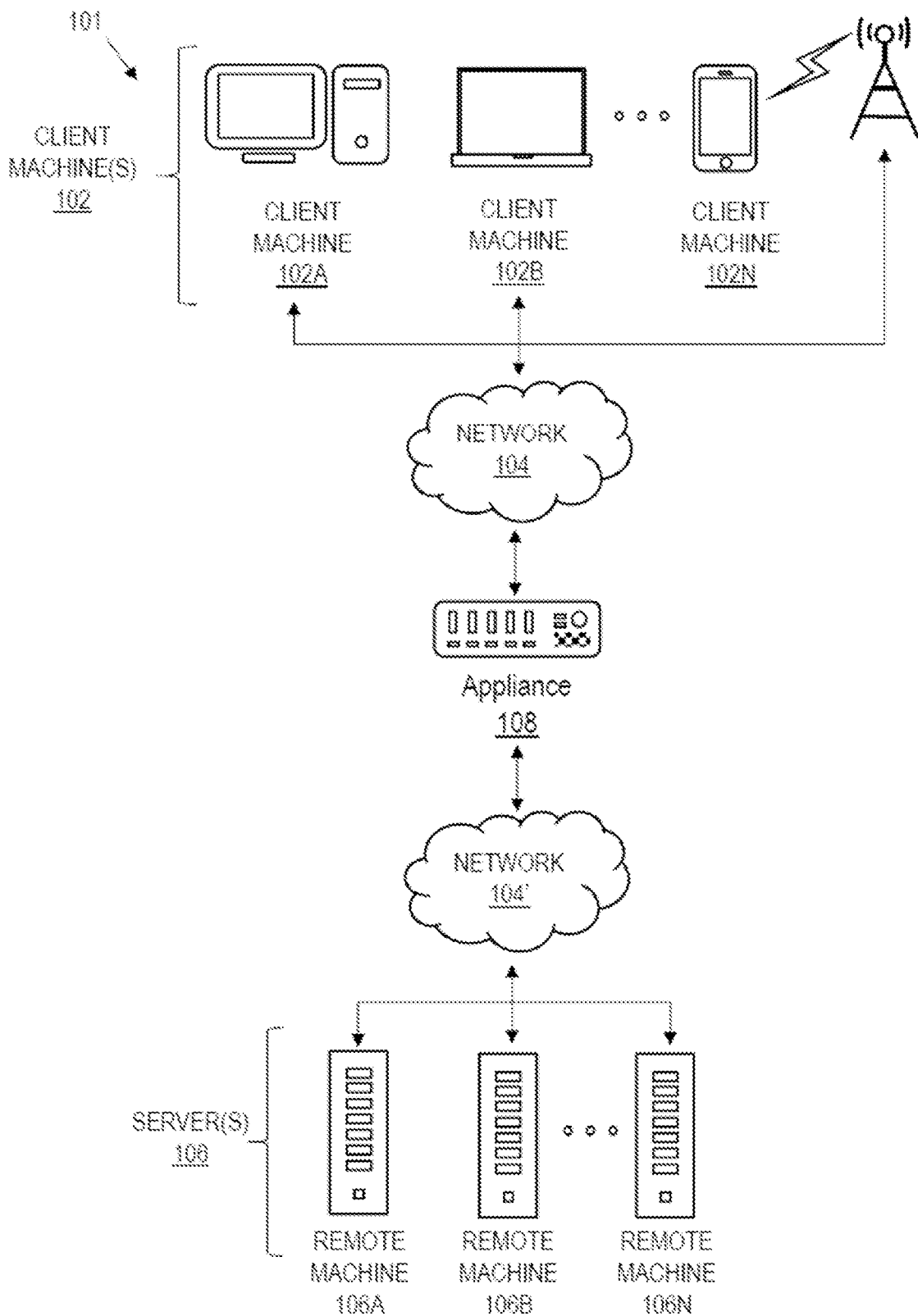
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
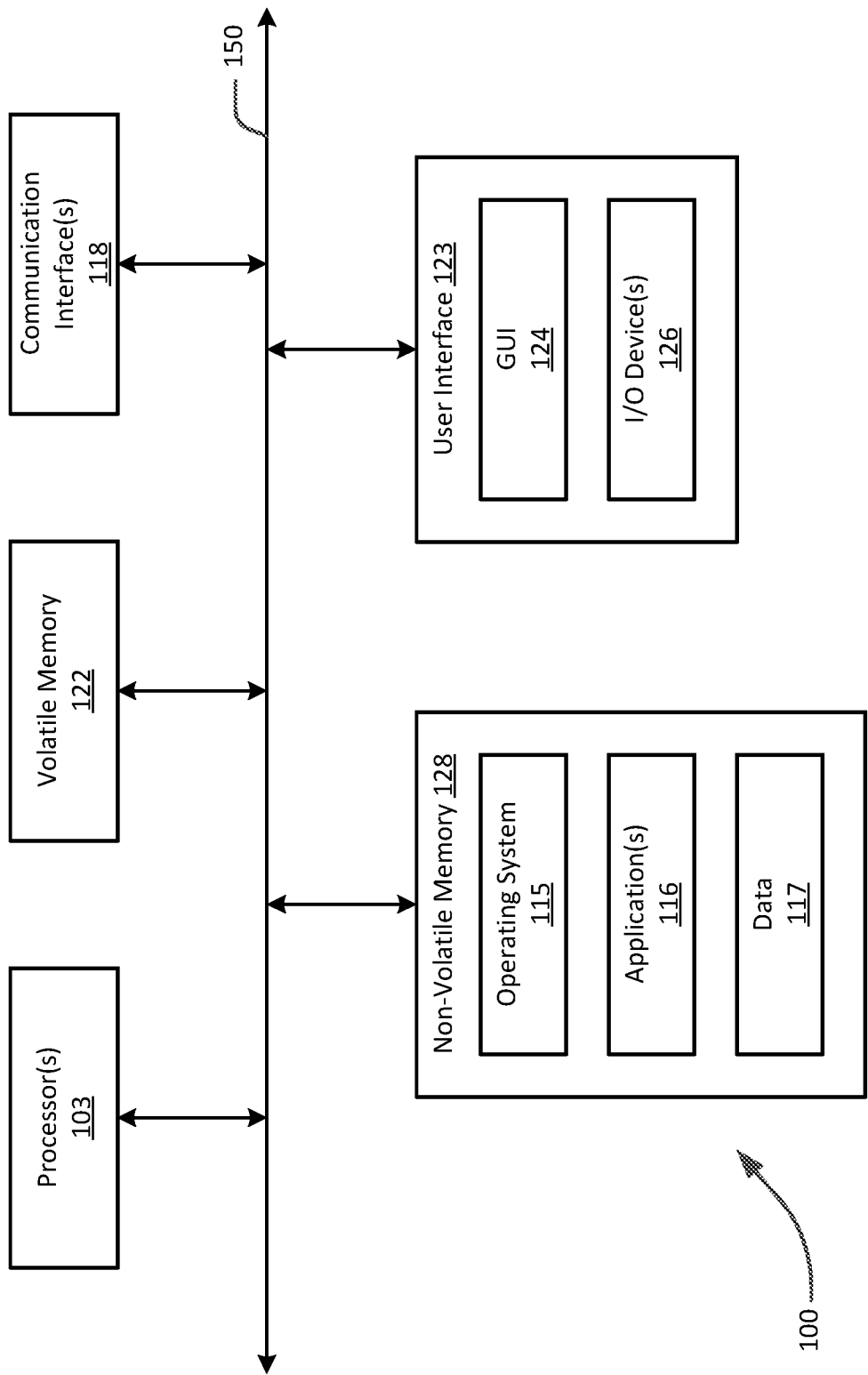
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
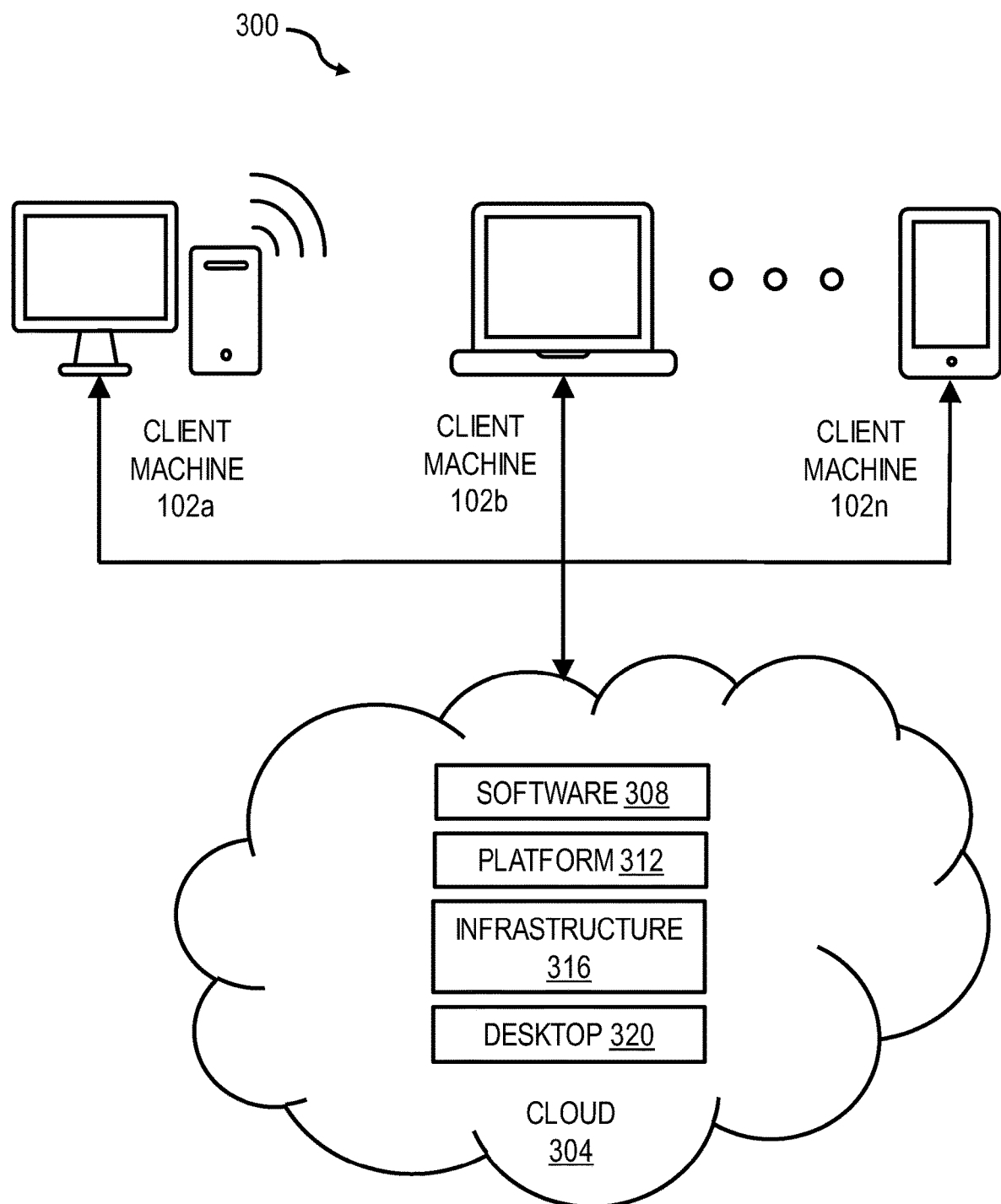
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
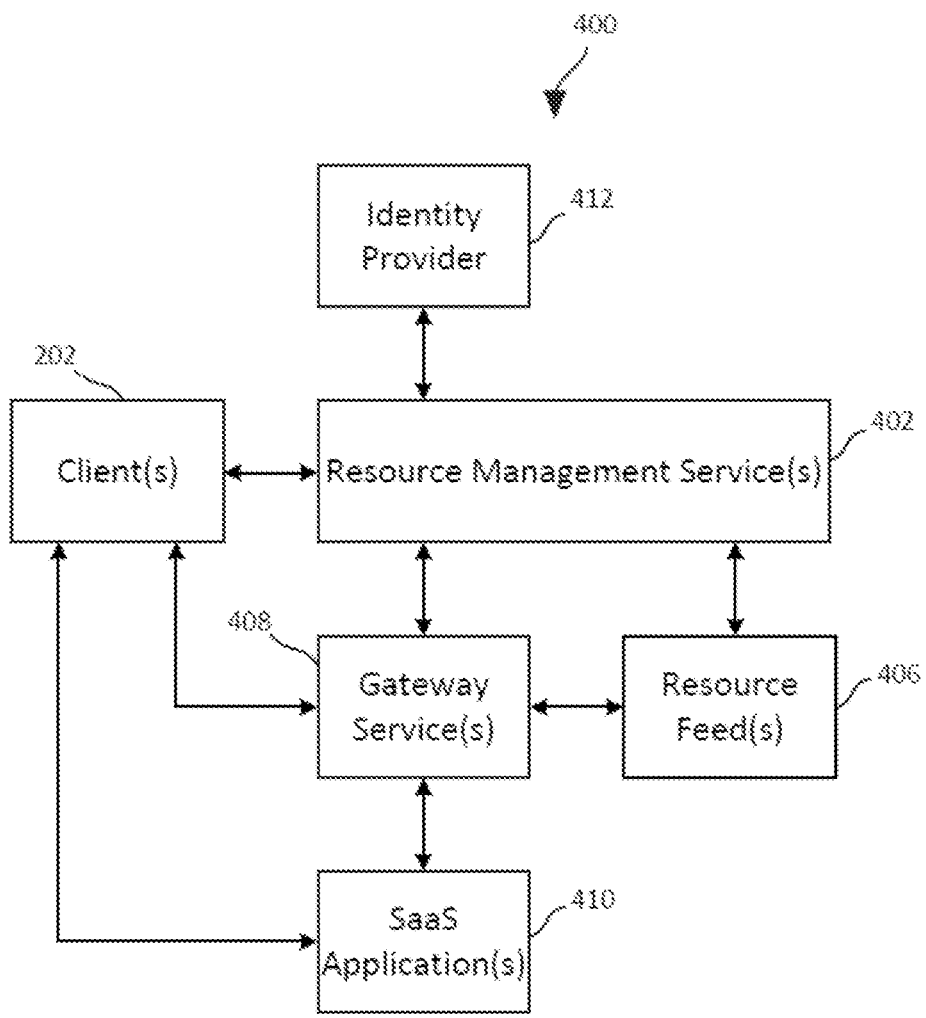
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
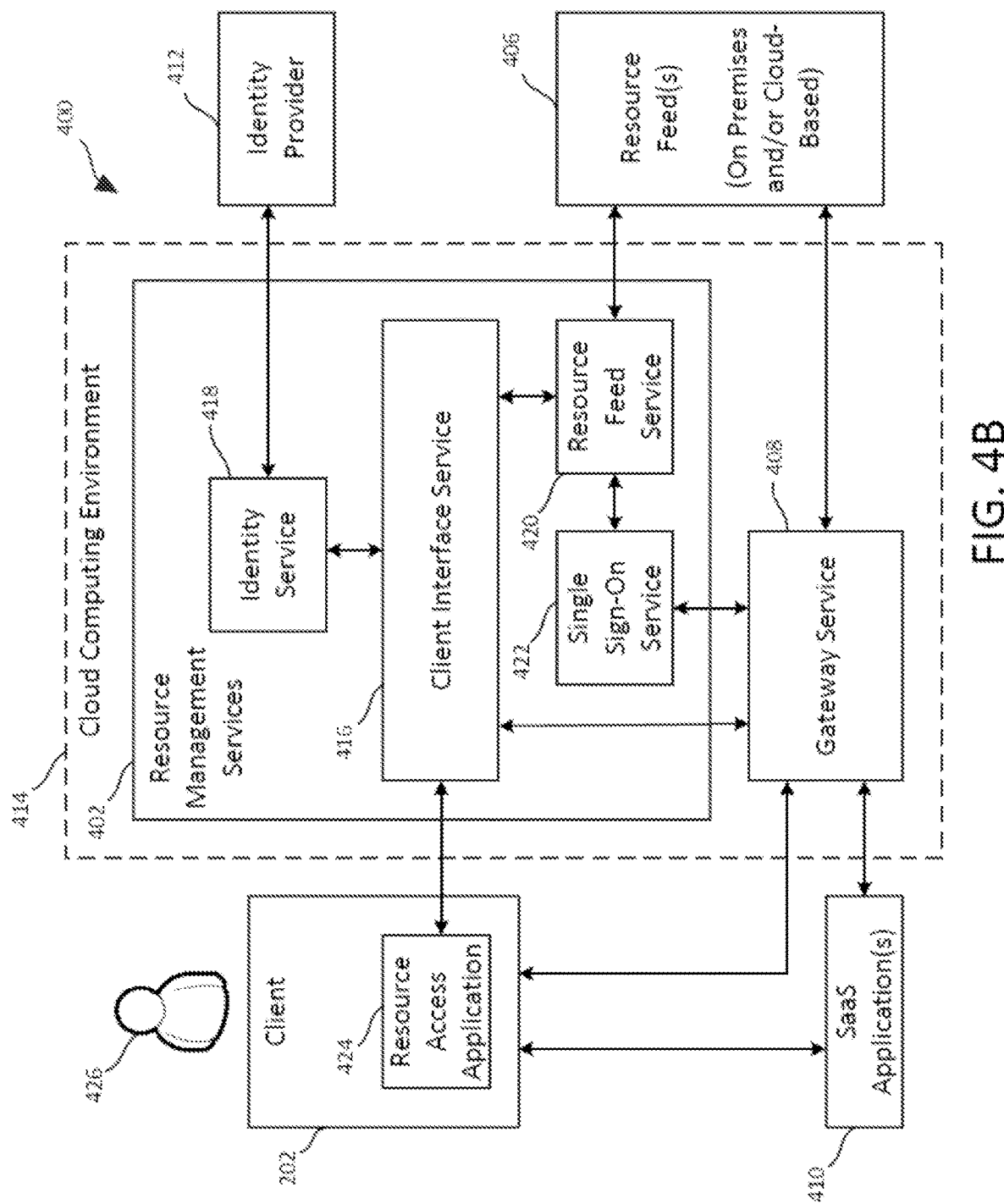
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
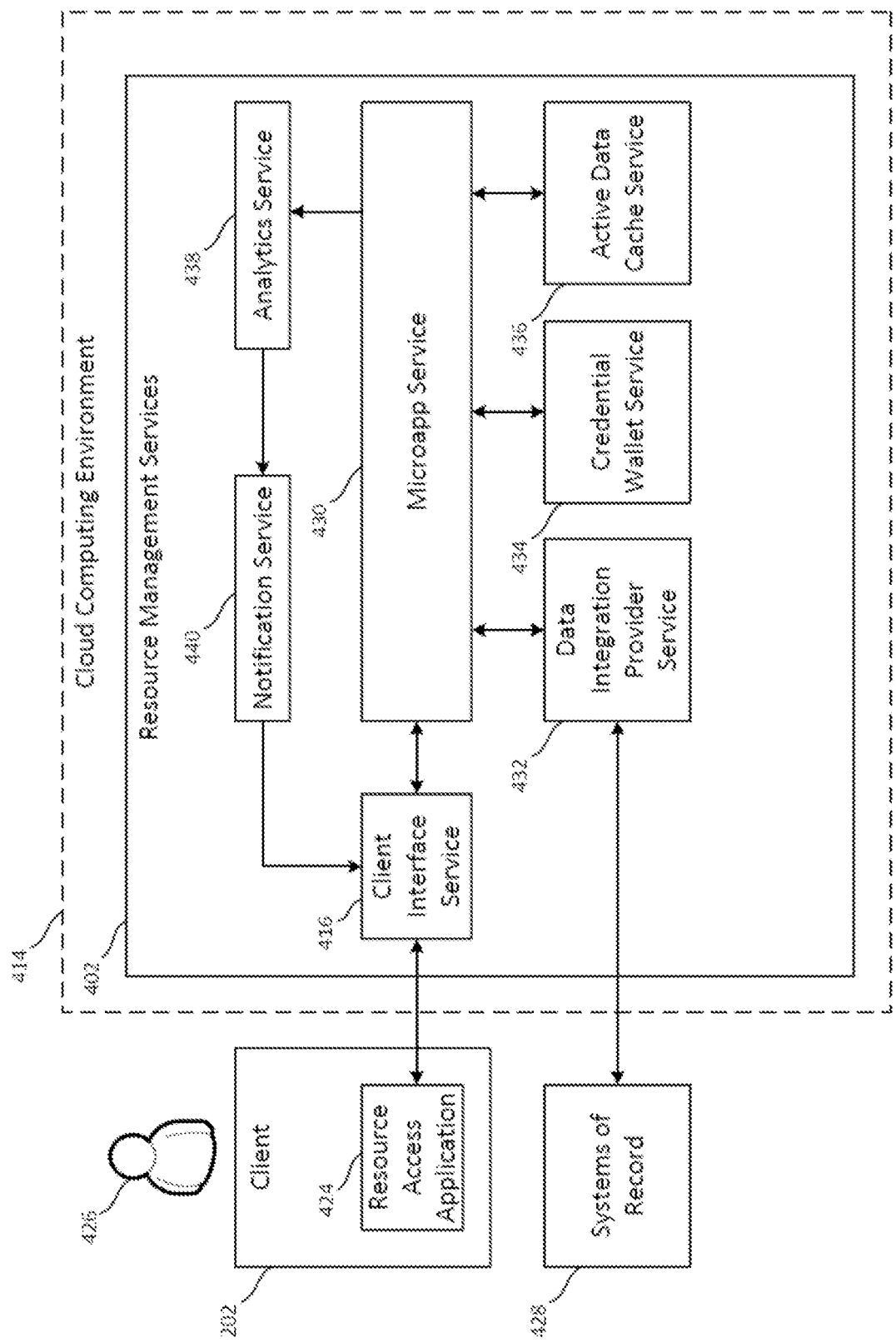
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
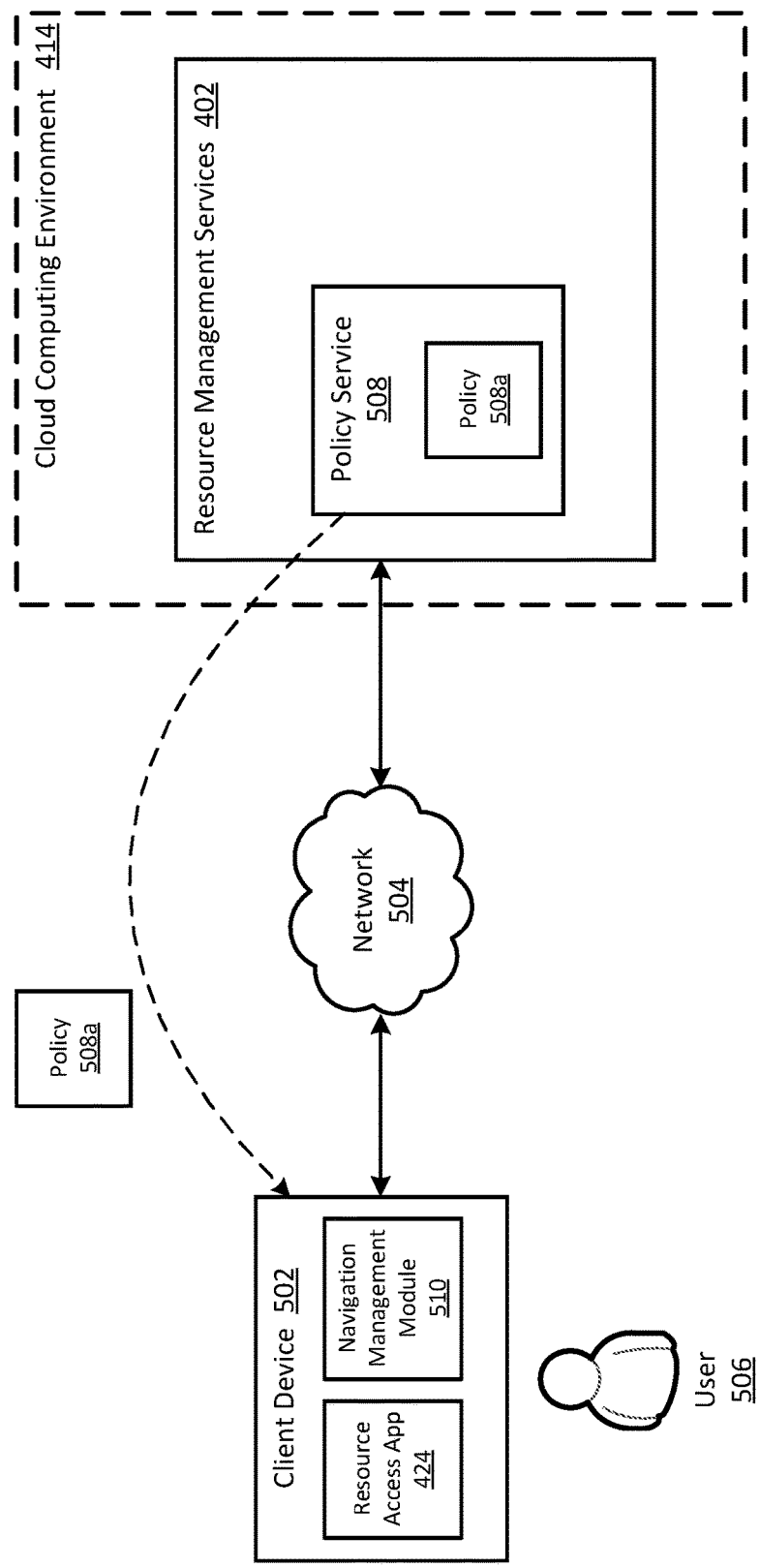
FIG. 5 is a block diagram of an illustrative network environment in which client devices can access electronic resources, in accordance with an embodiment of the present disclosure.

FIG. 5 is a block diagram of an illustrative network environment 500 in which client devices can access electronic resources, in accordance with an embodiment of the present disclosure. In brief, according to some embodiments, a client device can be understood as monitoring navigation to, or access of, an electronic resource (sometimes referred to herein more simply as a "resource"), such as a website, web application, software-as-a-service (SaaS) application, and virtual desktop, to name a few examples, and determining whether the navigation is insecure. In response to determining that the navigation is insecure, the client device can prevent the insecure navigation to the resource. As used herein, an insecure navigation generally refers to a navigation, or access, to which a security policy, such as an access policy, is not or unable to be applied and, as such, presents a potential security risk.

In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As shown in FIG. 5, network environment 500 can include one or more client devices 502 communicably coupled to resource management services 402 via a network 504. Network 504 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 504 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or otherwise associated with, a user 506. While only one client device 502 and one corresponding user 506 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, client device 502 may be substantially similar to client machine 102 described above in the context of FIGS. 1 and 3, computing device 100 described above in the context of FIG. 2, and/or client 202 described above in the context of FIGS. 4A-4C.

With continued reference to, and as shown in FIG. 5, user 506 may access resource management services 402 and other services and resources (e.g., SaaS applications and web applications) using resource access application 424 installed on client device 502. Resource management services 402 may manage and streamline access to enterprise resources provided by an organization for access and use by users associated with the organization. Resource access application 424 and associated components may provide user 506 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications along with other types of web apps and websites.

Resource management services 402 may include a policy service 508. Policy service 508 can maintain policy and other configuration information related to the one or more organizations operating in network environment 500 including resource access policies defined by the organizations for enforcement within network environment 500. Via policy service 508, an organization can define one or more security policies related to users 506 and/or devices 502 associated with the organization. As shown in FIG. 5, policy service 508 may include a security policy 508a that defines the resources and/or the type of access (or navigation) that particular users/devices and/or groups of users/devices are permitted. As one example, an organization may specify, via security policy 508a, a list of one or more addresses of safe or secure resources (e.g., by specifying URLs, domains, or other addresses associated with the secure resources). These resources (e.g., webpages, files, services, etc.) may include one or more resources that are managed, for example, via resource management services 402, and trusted by the organization. Such resources may be considered "permitted" or "accessible" resources, meaning that users are permitted or otherwise allowed to access these resources. Conversely, the other resources (i.e., resources not specified to be permitted resources) may be considered "unpermitted" or "inaccessible" resources that users are not permitted to access. Additionally or alternatively, an organization may indicate, via security policy 508a, a list of addresses of unpermitted resources that users are not permitted to access.

An organization may also specify, via security policy 508a, a list of "managed" applications (e.g., applications that are managed and trusted by the organization) which can be used to access resources. In other words, when using a managed application, users are permitted to navigate to or otherwise access resources (both permitted resources and unpermitted resources). Then, when a user attempts to navigate to an address using a managed application, it can be determined that the initiated navigation is a secure navigation since a managed application is being utilized to navigate to the resource. Even in cases where the resource is an unpermitted resource, the navigation to the unpermitted resource can be determined to be secure since the organization's security policies can be applied to the managed application.

An organization may also specify, via security policy 508a, a list of "unmanaged" applications (e.g., applications that are not managed by resource management services 402) which cannot be used to access resources. In other words, users are not permitted to use an unmanaged application to navigate to or otherwise access resources. Then, when a user attempts to navigate to an address using an unmanaged application, a determination can be made as to whether the address is of an unpermitted resource (i.e., a resource the user is not permitted to access). If the address is of an unpermitted resource, it can be determined that the initiated navigation is an insecure navigation since an unmanaged application is being utilized to navigate to the unpermitted resource. In some such cases, the address of the unpermitted resource can be replaced with an address of a safe or secure resource, causing the application to navigate to or otherwise access the safe resource. Here, the user is directed to a different resource (i.e., a safe resource) than the resource that the user wanted to access.

In some cases, when a user attempts to navigate to an address of an unpermitted resource using an unmanaged application (i.e., the initiated navigation is an insecure navigation), a managed application can be launched, and the unpermitted resource can be opened in the managed application. Here, the unpermitted resource is opened in a managed and secure environment.

In some cases, when a user attempts to navigate to an address of an unpermitted resource using an unmanaged application (i.e., the initiated navigation is an insecure navigation), a secure browser URL (e.g., a browser managed by the organization) can be obtained with which to navigate to the unpermitted resource, a secure browser session can be launched using the secure browser URL, and the unpermitted resource can be opened using the secure browser session. In one embodiment, the secure browser session can be launched in a tab of a UI in which the unmanaged application was running. Note that launching the secure browser session in the same tab provides improved user experience as the user is already interacting with the content in that tab.

A security policy targeting a particular user or group of users may be applicable to the device/devices assigned to the user/users. As discussed in detail below, these and other types of resource access policies can be used to manage navigation to, or access of, resources. In some embodiments, policy service 508 may identify which of the policies are applicable for which users/devices and deliver applicable security policies (e.g., one or more security policies 508a) to client devices 502 within network environment 500.

For example, and according to an embodiment, user 506 may use resource access application 424 executing on client device 502 to connect to resource management services 402. When resource access application 424 connects to resource management services 402, security policy 508a may be delivered to client device 502. For example, policy service 508 may send or otherwise provide to client device 502 the security policy 508a. Security policy 508a may specify the user's resource access policies that have been defined, for example, by the user's organization, including actions that are to be performed in cases of insecure navigation to prevent the insecure navigation to the resource.

As a solution to the aforementioned and other technical problems related to insecure navigation to, or access of, resources, in some embodiments, client device 502 is programmed to or otherwise includes a navigation management module 510 that is configured to monitor and detect a user using an application executing (or running) on client device 502 to initiate navigation to, or access of, a resource, to receive (or intercept) the initiated navigation, and to determine whether the initiated navigation is insecure based on applicable resource access policies (e.g., security policy

508a). In response to a determination that the initiated navigation is insecure, navigation management module 510 may modify the initiated navigation to prevent the insecure navigation to the resource. Various types of modifications can be performed, including replacing an address of the resource with an address of a safe or secure resource and/or launching a managed application and opening the navigated to resource in the managed application, for example. In an embodiment, navigation management module 510 may be implemented as a native application on client device 502, which allows navigation management module 510 to access the underlying operating system.

In more detail, and in accordance with some embodiments of the present disclosure, navigation management module 510 may be configured to detect when a process, such as an application process, starts executing on client device 502. For example, in an implementation, navigation management module 510 may generate a hook procedure (e.g., a process and/or thread creation API hook such as a CreateProcess function on WINDOWS or fork function on Linux or MACOS) to hook or inject into and execute prior to and/or at the start of an application process as the process is initiated (launched) prior to the normal (conventional) application processing. Hooking into the application process in this manner allows navigation management module 510 to determine whether the application process is related to a managed application or an unmanaged application. As noted above, an unmanaged application may be an application that is not managed by resource management services 402 and, as such, includes applications such as native browsers and local browsers. For example, the managed applications and/or unmanaged applications may be indicated in security policy 508a. In such cases, navigation management module 510 can determine whether the application process is related to a managed application or an unmanaged application based on the information contained in security policy 508a. If the application process is related to a managed application, navigation management module 510 may determine that the initiated navigation is secure (i.e., not an insecure navigation) since the navigation is initiated via a managed application. In this case, navigation management module 510 does not initiate any further actions to prevent or otherwise interfere with the normal processing of the managed application.

If the application process is related to an unmanaged application (e.g., a native or local browser), navigation management module 510 may generate a script or function (e.g., an application foreground event listener) to listen for the unmanaged application process (i.e., the unmanaged application) becoming a foreground (or active) process, and a corresponding subroutine (e.g., application foreground event handler) that is called (or initiated) when the application foreground event occurs. Upon the unmanaged application process becoming a foreground process, the application foreground event handler may listen for the inputting of an address to access a resource using the unmanaged application. For example, the application foreground event handler may generate event listeners on user interface elements of the unmanaged application to listen for the inputting of an address and corresponding event handlers that are initiated when an address input event occurs. As another example, the application foreground event handler may generate a keyboard mouse handler to detect an enter key being pressed or a mouse/user event handler to detect a navigation control being clicked. In any case, the event handlers that are initiated when an address input event occurs may check an applicable resource access policy (e.g., security policy 508a) to the input address to determine whether the initiated navigation to the resource is an insecure navigation.

For example, in the case where the unmanaged application is a local or native browser, navigation management module 510 may generate an event handler that is initiated when the browser window is in the foreground (i.e., the browser window becomes the foreground window). In such example cases, the event handler (e.g., window foreground event handler) may generate scripts or functions (e.g., user interface element event listeners) that listen for events on user interface elements, such as a URL address bar, of the browser. For example, the window foreground event handler may generate event listeners on the URL address bar to listen for events, such as a FocusChangeEvent, and be notified when the contents (or text) in the URL address bar change. The change in the contents of the URL address bar may be indicative of an address being input to the browser. As another example, the window foreground event hander may use UI automation to access the UI element corresponding to the address bar and access its property, such as value/text, to monitor for a change in the URL address. Upon being notified of the change in the contents of the URL address bar (i.e., initiation of the event listener on the URL address bar), a corresponding event handler (e.g., URL address bar event handler) may generate a keyboard hook procedure to monitor for and detect the input of the "enter" key. Upon the input of the "enter" key, navigation management module 510 may check the address in the URL address bar (i.e., the input URL) with an applicable resource access policy (e.g., security policy 508a) to determine whether the address is of an unpermitted resource (i.e., a resource that the user is not permitted to access). If the address is of an unpermitted resource, navigation management module 510 can determine that the initiated navigation to the resource referenced by the address is an insecure navigation.

In cases where the initiated navigation to a resource is an insecure navigation, navigation management module 510 can modify the initiated navigation to prevent the insecure navigation to the resource as specified by security policy 508a, for example. As one example, upon a determination that the initiated navigation is an insecure navigation, navigation management module 510 may replace the address in the URL address bar with an address of a safe or secure resource (e.g., an address of a secure browser or a resource managed by resource management services 402) as specified in security policy 508a, for example. As another example, upon a determination that the initiated navigation is an insecure navigation, navigation management module 510 may launch a managed application as specified in security policy 508a, for example, and cause the resource referenced by the address in the URL address bar to be opened in the managed application. In some such examples, the managed application (e.g., a secure browser) can be launched in a tab of a UI in which the unmanaged application was running, and the resource referenced by the address in the URL address bar to be opened in the managed application launched in the same tab. As another example, upon a determination that the initiated navigation is an insecure navigation, navigation management module 510 may prevent navigation to the resource referenced by the address in the URL address bar by use of the local or native browser. In any such cases, navigation management module 510 may also alert or notify an analytics service and/or a user of the attempted insecure navigation.

In some embodiments, client device 502 may be configured to detect a use of a hyperlink (sometimes referred to herein more simply as a "link") to initiate navigation to, or access of, a resource, and to receive (or intercept) the initiated navigation. Client device 502 may then determine whether the initiated navigation is insecure based on applicable resource access policies (e.g., security policy 508*a*), and, responsive to a determination that the initiated navigation is insecure, modify the initiated navigation to prevent the insecure navigation to the resource. Such navigation to a resource using a link may result in the resource being opened in a native or local browser, in which case the organization is out of the loop with respect to the opening of the resource and may not be able to apply its conventional security and/or access policies.

In an illustrative use case and embodiment, a user (e.g., user 506) may click, select, or otherwise activate a link within an application (e.g., a Slack client or a publishing application client), which may be a managed application or an unmanaged application, to initiate navigation to, or access of, a resource referenced by the link. To detect a use of a link to initiate navigation to, or access of, a resource, in some embodiments, navigation management module 510 may generate a hook procedure (e.g., an operating system API hook such as a CreateProcess function) to hook or inject into and execute prior to and/or at the start of a process as the process is initiated (launched) prior to normal processing of the launched process. Hooking into the launched process in this manner allows navigation management module 510 to determine whether the launched process is related to a clicking, selecting, or activation of a link. For example, the hook procedure can check the arguments that are passed with the hook procedure (e.g., arguments of the CreateProcess function) to determine whether the arguments include an address (e.g., URL) of a resource. If the launched process is not related to a clicking, selecting, or activation of a link (i.e., the arguments passed with the hook procedure do not include an address of a resource), the hook procedure may return, thus allowing normal processing of the launched process. However, if the launched process is related to a clicking, selecting, or activation of a link (i.e., the arguments passed with the hook procedure include an address of a resource), navigation management module 510 may check the address associated with the link (e.g., URL) with an applicable resource access policy (e.g., security policy 508*a*) to determine whether the initiated navigation to the resource is an insecure navigation. If the initiated navigation to the resource is insecure, navigation management module 510 can modify the initiated navigation to prevent the insecure navigation to the resource as specified by security policy 508*a*, as previously described herein, for example.

In some embodiments, navigation management module 510 may utilize optical character recognition (OCR) or other computer vision (CV) techniques to determine whether the content of an application (e.g., a managed application or an unmanaged application) contains a link. The content of the application may be in a text-based format (e.g., textual data) or an image-based format (e.g., an image of the content). In the case of an image, navigation management module 510 may utilize OCR to convert the image of the content to textual data. It will be appreciated that other methods/techniques of text extraction may also be used (e.g., textual data may be embedded in the content and extracted). In any case, navigation management module 510 may utilize OCR to scan the content to identify any links contained in the content. For example, navigation management module 510 may utilize OCR to scan the textual data for certain keywords or phrases, and/or search the textual data using regular expressions, for patterns of characters indicative of a URL to identify any links contained in the content. For the individual links that are identified, navigation management module 510 may also identify the coordinates of the text contained in the link (e.g., a URL). Having identified the link(s) contained in the content of the application, navigation management module 510 may generate user interface element event listeners/handlers and/or system/OS handlers (e.g., a mouse handler) to listen for and process a clicking or activation of the link(s) contained in the application. In an embodiment, the click event coordinates may be compared with the coordinates identified and corresponding to the text contained in the link being clicked. In such embodiments, the actual mouse click event is prevented and the text contained in the link (e.g., a URL) is instead checked against the applicable access policies and handled appropriately.

Figure 6:
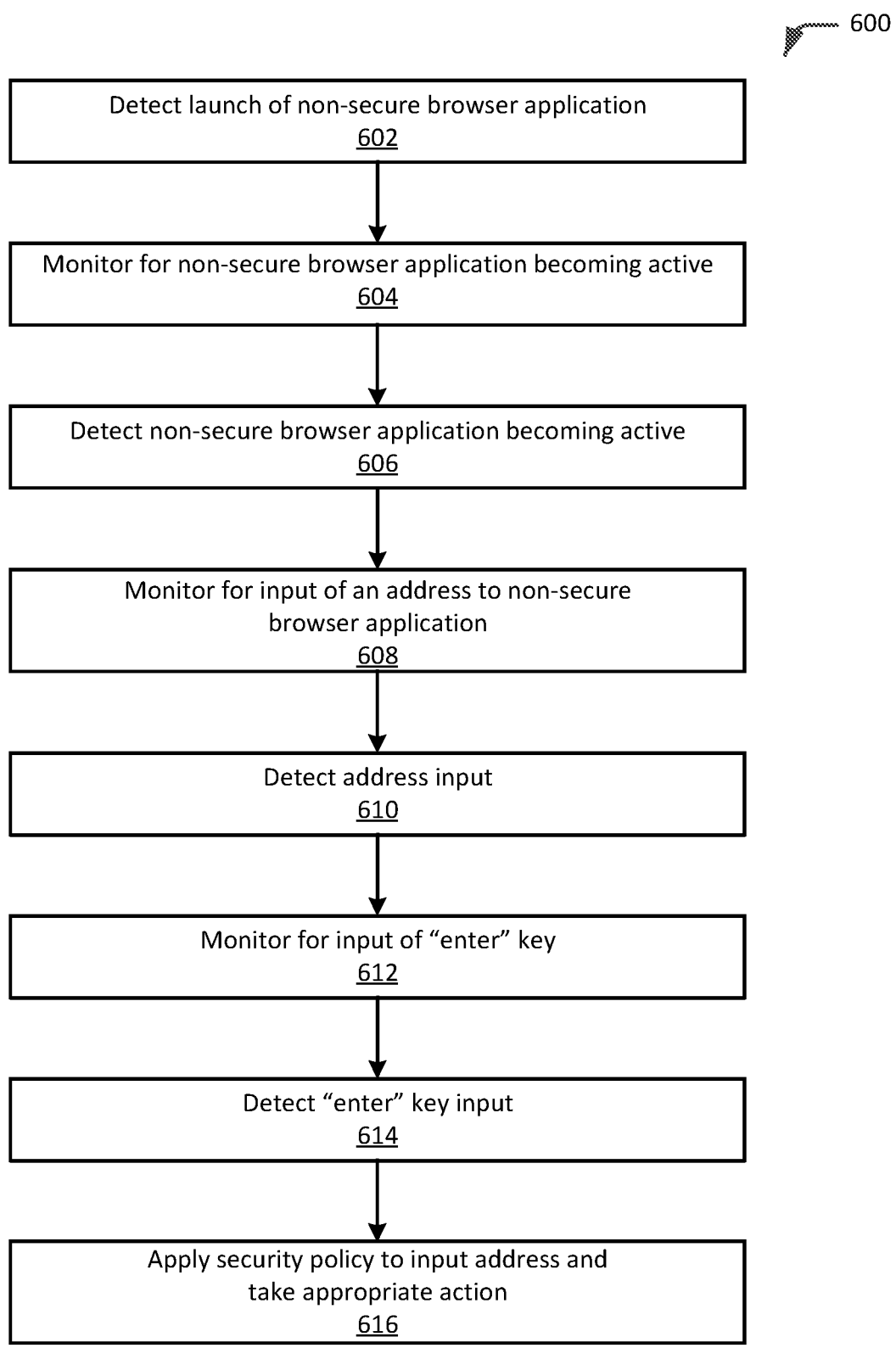
FIG. 6 is a flow diagram of an illustrative process for navigation using a browser, in accordance with an embodiment of the present disclosure.

FIG. 6 is a flow diagram of an illustrative process 600 for navigation using a browser, in accordance with an embodiment of the present disclosure. Example process 600, and example process 700 further described below, may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 600, and example process 700 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102*a*-102*n* of FIG. 3, clients 202 of FIGS. 4A-4C, and/or client device 502 of FIG. 5). For example, the operations, functions, or actions described in the respective blocks of example process 600, and example process 700 further described below, may be implemented by applications 116 and/or data 117 of computing device 100.

With reference to process 600 of FIG. 6, a user, such as user 506, may execute resource access application 424 on client device 502, and use resource access application 424 to connect to resource management services 402. Upon connecting to resource management services 424, client device 502 may receive security policy 508*a*. For example, policy service 508 of resource management services 402 may send or otherwise provide to client device 502 the security policy 508*a*. Security policy 508*a* may specify the resource access policies that are applicable to user 506. Resource management services 402 may also send or otherwise provide to client device 502 the navigation management module 510 for execution on client device 502. In some implementations, navigation management module 510 may be integrated as part of or into resource access application 424.

At 602, navigation management module 510 may detect a launch of a non-secure browser application (e.g., local or native browser or other unmanaged application). For example, navigation management module 510 may generate a hook procedure (e.g., operating system API hook) to hook into and execute at the start of a process as the process is launched prior to the normal processing of the launched process. Using the generated hook procedure, navigation management module 510 can detect a launch of a process and may determine that the launched process is related to a non-secure browser application based on the information contained in security policy 508*a*.

Upon determination of an initiation of a non-secure browser application process, at 604, navigation management module 510 may monitor for the non-secure browser application becoming active. For example, navigation management module 510 may generate a browser application foreground event listener to listen for the non-secure browser application becoming a foreground (active) process, and a corresponding browser application foreground event handler that is initiated (or executed) when the event (i.e., the non-secure browser application becoming a foreground process) occurs. In an example use case, user 506 may use client device 502 to launch the non-secure browser application to use in navigating to a resource.

At 606, navigation management module 510 may detect the non-secure browser application becoming a foreground (active) process. For example, the detection may be based on the initiation of the browser application foreground event handler. Continuing the above example use case, user 506 may make a window (UI) of the non-secure browser application on client device 502 an active window to input an address of a resource.

Upon detection of the non-secure browser application process becoming a foreground (active) process, at 608, navigation management module 510 may monitor for an input of an address (e.g., an address of a resource) to the non-secure browser application. For example, initiated browser application foreground event handler may generate event listeners on user interface elements of the non-secure browser application to listen for the inputting of an address, and corresponding event handlers that are initiated when an address input event occurs.

At 610, navigation management module 510 may detect an address input to the non-secure browser application. For example, the detection may be based on the initiation of a user interface element event handler. Continuing the above example use case, user 506 may input an address of a resource in a URL address bar provided in the non-secure browser application window.

Upon detection of an address input, at 612, navigation management module 510 may monitor for an input of an "enter" key. For example, the initiated event handler (e.g., the initiated user interface element event handler) may generate a keyboard hook procedure to monitor for the input of the "enter" key. At 614, navigation management module 510 may detect the input of the "enter" key. For example, using the generated keyboard hook procedure, navigation management module 510 may detect the inputting of the "enter" key to initiate navigation to an address that was previously entered. Continuing the above example use case, user 506 may press the "enter" key on a keyboard subsequent to inputting the address of the resource in the URL address bar provided in the non-secure browser application window to initiate navigation to the resource.

Upon detection of the inputting of the "enter" key, at 616, navigation management module 510 may check the input address with security policy 508a to determine whether the address is of an unpermitted resource (i.e., a resource that user 506 is not permitted to access). If the address is of an unpermitted resource, the navigation management module 510 can determine that the initiated navigation is an insecure navigation. In cases where the initiated navigation is an insecure navigation, navigation management module 510 may modify the initiated navigation to prevent the insecure navigation as specified by security policy 508a. As an example, navigation management module 510 may prevent the insecure navigation by causing the address of the unpermitted resource to be replaced with an address of a secure address as specified by security policy 508a.

Otherwise, if the address is of a resource that is not an unpermitted resource (e.g., the address is of a permitted resource), the navigation management module 510 can determine that the initiated navigation is not an insecure navigation. In cases where the initiated navigation is not an insecure navigation, navigation management module 510 does not initiate any further actions to prevent or otherwise interfere with the initiated navigation.

In some embodiments, navigation management module 510 may check a portion of the input address, such as a domain portion the address, to determine whether the address is of an unpermitted resource. By checking a portion of the input address, navigation management module 510 need not wait for the complete address to be input to the non-secure browser application and may perform the check upon the user inputting the domain portion of the address. Then, upon detection of the "enter" key, navigation management module 510 may take an appropriate action(s) based on the determination made by the keyboard hook procedure.

Figure 7:
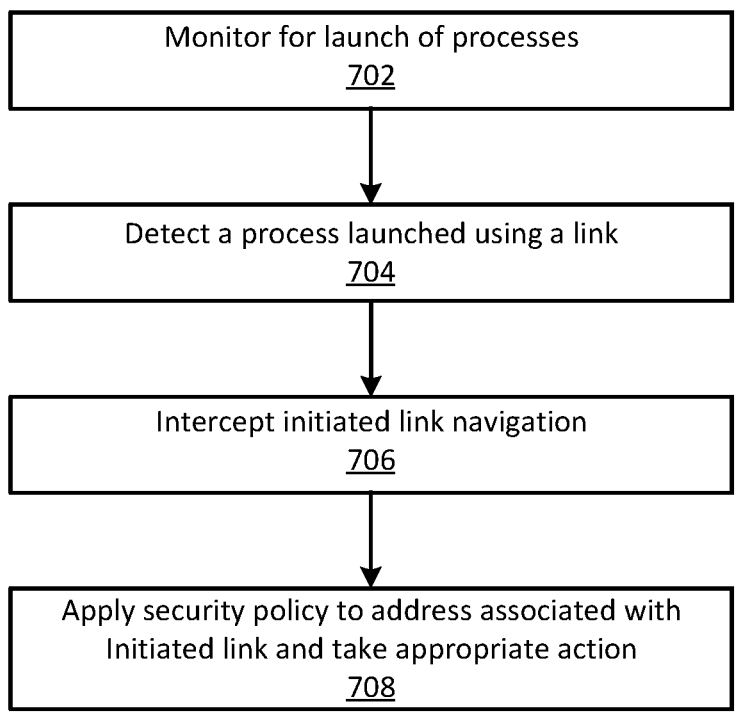
FIG. 7 is a flow diagram of an illustrative process for navigation using a link, in accordance with an embodiment of the present disclosure.

FIG. 7 is a flow diagram of an illustrative process 700 for navigation using a link, in accordance with an embodiment of the present disclosure. With reference to process 700, a user, such as user 506, may execute resource access application 424 on client device 502, and use resource access application 424 to connect to resource management services 402. Upon connecting to resource management services 424, client device 502 may receive security policy 508a. For example, policy service 508 of resource management services 402 may send or otherwise provide to client device 502 the security policy 508a. Security policy 508a may specify the resource access policies that are applicable to user 506. Resource management services 402 may also send or otherwise provide to client device 502 the navigation management module 510 for execution on client device 502. In some implementations, navigation management module 510 may be integrated as part of or into resource access application 424.

At 702, navigation management module 510 may monitor for the launch of process. For example, navigation management module 510 may generate a hook procedure (e.g., operating system API hook) to hook into and execute at the start of a process as the process is initiated. The generated hook procedure may be initiated upon a launch of a process on client device 502 prior to the normal processing of the launched process. As an example use case, user 506 may use client device 502 to launch a conferencing application client to use in participating in a scheduled conference session.

At 704, navigation management module 510 may detect a launch of a process and determine that the process was launched using a link. For example, navigation management module 510 may determine that the process was launched using a link based on the presence of an address (e.g., URL) in the arguments which were passed to the hook procedure. Continuing the above example use case, user 506 may click a link provided in the conferencing application client window while participating in the conference session to access a webpage.

Upon determination that the process was launched using a link, at 706, navigation management module 510 may intercept the initiated link navigation to the resource referenced by the address associated with the link. Intercepting the initiated link navigation allows navigation management module 510 to apply security policy 508a and determine whether the initiated link navigation to the resource is an insecure navigation.

To accomplish this, at 708, navigation management module 510 may check the address associated with the link with security policy 508a to determine whether the address is of an unpermitted resource (i.e., a resource that user 506 is not permitted to access). If the address is of an unpermitted resource, navigation management module 510 can determine that the initiated link navigation is an insecure navigation. In cases where the initiated link navigation is an insecure navigation, navigation management module 510 may modify the initiated link navigation to prevent the insecure navigation as specified by security policy 508a. As an example, navigation management module 510 may prevent the insecure link navigation by launching a managed application as specified by security policy 508a and causing the resource referenced by the address associated with the link (i.e., the unpermitted resource) to be opened in the launched managed application.

Otherwise, if the address is of a resource that is not an unpermitted resource (e.g., the address is of a permitted resource), navigation management module 510 can determine that the initiated link navigation is not an insecure navigation. In cases where the initiated link navigation is not an insecure navigation, navigation management module 510 does not initiate any further actions to prevent or otherwise interfere with the initiated link navigation.

FURTHER EXAMPLE EMBODIMENTS

The following examples pertain to further embodiments, from which numerous permutations and configurations will be apparent.

Example 1 includes a method including: receiving, by a computing device, input via an application of the computing device, the input to initiate navigation to a resource; determining, by the computing device, that navigation to the resource via the application is insecure; and, responsive to the determination that the navigation is insecure, modifying, by the computing device, the navigation to the resource so as to prevent navigation to the resource via the application.

Example 2 includes the subject matter of Example 1, wherein the input being an address of the resource entered into an address bar provided by the application.

Example 3 includes the subject matter of Example 1, wherein the input being an activation of a link included in the application.

Example 4 includes the subject matter of any of Examples 1 through 3, wherein the application is unmanaged by a resource management service.

Example 5 includes the subject matter of any of Examples 1 through 3, wherein the application is one of a native browser application or a local browser application.

Example 6 includes the subject matter of any of Examples 1 through 5, wherein the modification of the navigation includes replacing an address of the resource with a different address.

Example 7 includes the subject matter of any of Examples 1 through 5, wherein the modification of the navigation includes launching a managed application and opening the resource within the managed application.

Example 8 includes the subject matter of any of Examples 1 through 5, wherein the modification of the navigation includes generating a notification to one of a user of the application or a security operations center.

Example 9 includes a system including a memory and one or more processors in communication with the memory and configured to: receive input via an application of the computing device, the input to initiate navigation to a resource; determine that navigation to the resource via the application is insecure; and, responsive to the determination that the navigation is insecure, modify the navigation to the resource so as to prevent navigation to the resource via the application.

Example 10 includes the subject matter of Example 9, wherein the input being an address of the resource entered into an address bar provided by the application.

Example 11 includes the subject matter of Example 9, wherein the input being an activation of a link included in the application.

Example 12 includes the subject matter of any of Examples 9 through 11, wherein the application is unmanaged by a resource management service.

Example 13 includes the subject matter of any of Examples 9 through 11, wherein the application is unmanaged by a resource management service.

Example 14 includes the subject matter of any of Examples 9 through 13, wherein to modify the navigation includes to replace an address of the resource with a different address.

Example 15 includes the subject matter of any of Examples 9 through 13, wherein to modify the navigation includes to launch a managed application and open the resource within the managed application.

Example 16 includes the subject matter of any of Examples 9 through 13, wherein to modify the navigation includes to generate a notification to one of a user of the application or a security operations center.

Example 17 includes a method including: receiving, by a computing device, an input via an application of the computing device to navigate to a resource; determining, by the computing device, that the navigation is insecure based on a list of one or more addresses of allowable resources assigned to the computing device; and, responsive to the determination that the navigation is insecure, modifying, by the computing device, the navigation to the resource so as to prevent navigation to the resource via the application.

Example 18 includes the subject matter of Example 17, wherein the input being one of an address of the resource entered into an address bar provided by the application or an activation of a link included in the application.

Example 19 includes the subject matter of any of Examples 17 and 18, wherein the application is unmanaged by a resource management service.

Example 20 includes the subject matter of any of Examples 17 and 18, wherein the application is one of a native browser application or a local browser application.

Example 21 includes the subject matter of any of Examples 17 through 20, wherein the modification of the navigation includes replacing an address of the resource with a different address.

Example 22 includes the subject matter of any of Examples 17 through 20, wherein the modification of the navigation includes launching a managed application and opening the resource within the managed application.

Example 23 includes the subject matter of any of Examples 17 through 20, wherein the modification of the navigation includes generating a notification to one of a user of the application or a security operations center.

Example 24 includes a system including a memory and one or more processors in communication with the memory and configured to: receive an input via an application of the computing device to navigate to a resource; determine that the navigation is insecure based on a list of one or more addresses of allowable resources assigned to the computing device; and, responsive to the determination that the navigation is insecure, modify the navigation to the resource so as to prevent navigation to the resource via the application.

Example 25 includes the subject matter of Example 24, wherein the input being one of an address of the resource entered into an address bar provided by the application or an activation of a link included in the application.

Example 26 includes the subject matter of any of Examples 24 and 25, wherein the application is unmanaged by a resource management service.

Example 27 includes the subject matter of any of Examples 24 and 25, wherein the application is one of a native browser application or a local browser application.

Example 28 includes the subject matter of any of Examples 24 through 27, wherein to modify the navigation includes to replace an address of the resource with a different address.

Example 29 includes the subject matter of any of Examples 24 through 27, wherein to modify the navigation includes to launch a managed application and open the resource within the managed application.

Example 30 includes the subject matter of any of Examples 24 through 27, wherein to modify the navigation includes to generate a notification to one of a user of the application or a security operations center.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   receiving, by a computing device, an input, wherein the input is provided via an application of the computing device, the input to initiate navigation to a resource;
   intercepting, by the computing device, initiated navigation to the resource prior to navigation to the resource;
   determining, by the computing device, that navigation to the resource via the application of the computing device is insecure based upon at least one of:

a check of an address of the resource with a resource access policy, wherein the address is one of a uniform resource locator (URL) or a domain; or a check of the application of the computing device with the resource access policy; and responsive to a determination that navigation to the resource via the application of the computing device is insecure, modifying, by the computing device, navigation to the resource so as to prevent navigation to the resource via the application of the computing device, wherein modifying the insecure navigation to the resource includes replacing an address of the resource with an address of a secure resource different than the resource.

2. The method of claim 1, wherein the input is an address of the resource entered into an address bar provided by the application of the computing device.

3. The method of claim 1, wherein the input is an activation of a link included in the application of the computing device.

4. The method of claim 1, wherein the application of the computing device is unmanaged by a resource management service.

5. The method of claim 1, wherein the application of the computing device is one of:

a native browser application; or a local browser application.

6. The method of claim 1, wherein modifying navigation includes:

launching a managed application; and opening the resource within the managed application.

7. The method of claim 1, wherein modifying navigation includes generating a notification to one of:

a user of the application; or a security operations center.

8. A system comprising:

a memory; and one or more processors in communication with the memory and configured to:

receive an input, wherein the input is provided via an application of the computing device, the input to initiate navigation to a resource;

intercept initiated navigation to the resource prior to navigation to the resource;

determine that navigation to the resource via the application is insecure based upon at least one of:

a check of an address of the resource with a resource access policy, wherein the address is one of a uniform resource locator (URL) or a domain; or a check of the application with the resource access policy; and responsive to a determination that navigation to the resource via the application is insecure, modify navigation to the resource so as to prevent navigation to the resource via the application, wherein modify the insecure navigation to the resource includes replace an address of the resource with an address of a secure resource different than the resource.

9. The system of claim 8, wherein the input is an address of the resource entered into an address bar provided by the application.

10. The system of claim 8, wherein the input is an activation of a link included in the application.

11. The system of claim 8, wherein the application is unmanaged by a resource management service.

12. The system of claim 8, wherein the application is one of:

a native browser application; or a local browser application.

13. The system of claim 8, wherein modify the navigation includes:

launch a managed application; and open the resource within the managed application.

14. The system of claim 8, wherein modify the navigation includes generate a notification to one of:

a user of the application; or a security operations center.

15. A method comprising:

receiving, by a computing device, an input, wherein the input is provided via an application of the computing device to navigate to a resource;

intercepting, by the computing device, the input to navigate to the resource prior to navigation to the resource;

determining, by the computing device, that to navigate to the resource is insecure based upon a check of a resource access policy that includes a list of one or more addresses of allowable resources assigned to the computing device, wherein individual addresses is one of a uniform resource locator (URL) or a domain; and responsive to a determination that to navigate to the resource is insecure, modifying, by the computing device, navigation to the resource so as to prevent navigation to the resource via the application of the computing device, wherein modifying the insecure navigation to the resource includes replacing an address of the resource with an address of a secure resource different than the resource.

16. The method of claim 15, wherein the input being one of:

an address of the resource entered into an address bar provided by the application of the computing device; or an activation of a link included in the application of the computing device.

17. The method of claim 15, wherein the application of the computing device is unmanaged by a resource management service.

18. The method of claim 15, wherein the application of the computing device is one of:

a native browser application; or a local browser application.

* * * * *